Dec. 26, 1967 R. B. HANSEN 3,360,604
SOUND DETECTOR FOR COLOR TELEVISION
Original Filed April 20, 1964
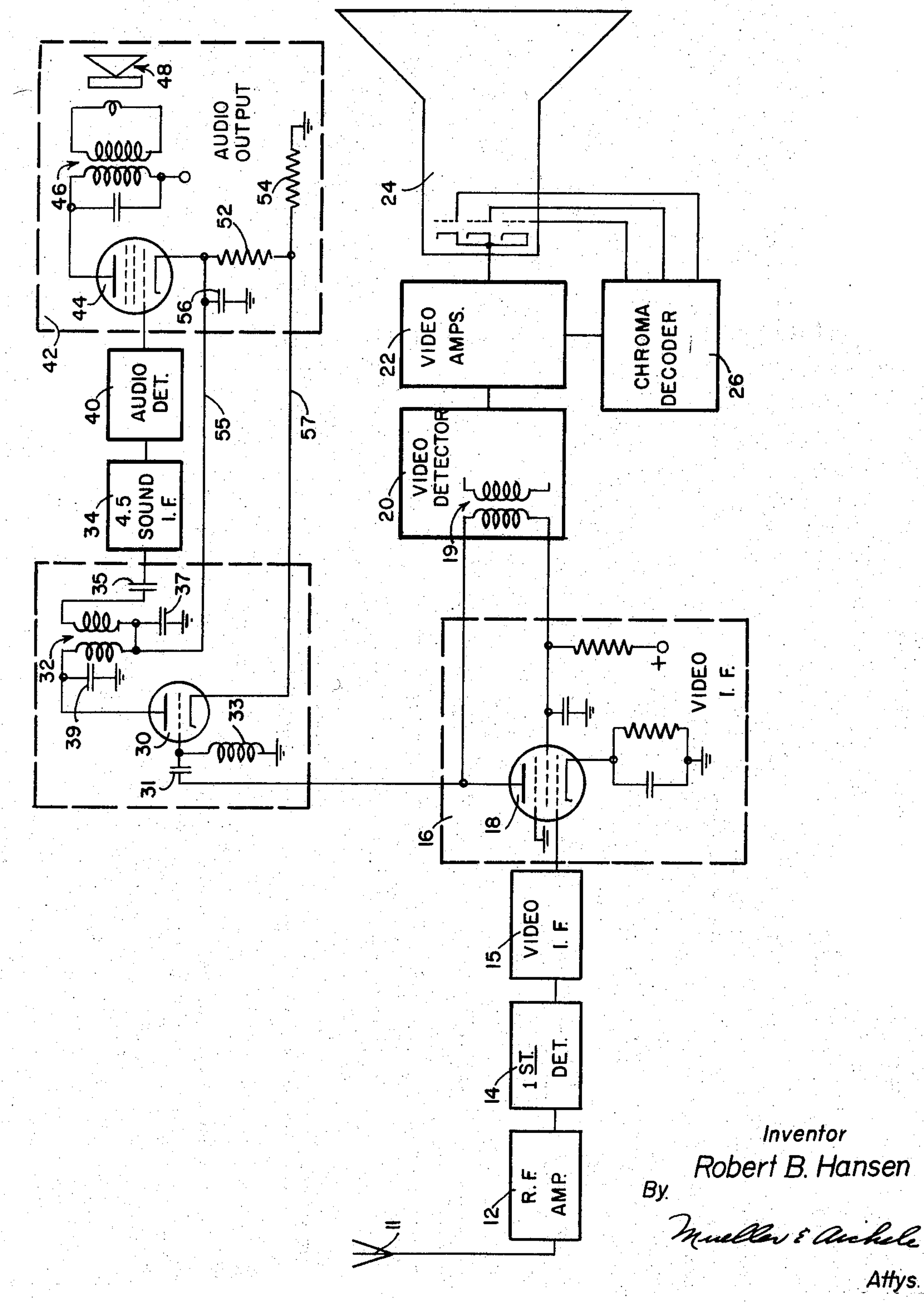
Inventor
Robert B. Hansen
By Mueller & Aichele
Attys.

3,360,604
SOUND DETECTOR FOR COLOR TELEVISION
Robert B. Hansen, Arlington Heights, Ill., assignor to Motorola, Inc., Franklin Park, Ill., a corporation of Illinois
Continuation of application Ser. No. 361,037, Apr. 20, 1964. This application Aug. 8, 1966, Ser. No. 571,131
5 Claims. (Cl. 178—5.4)

This is a continuation of application Ser. No. 361,037, filed Apr. 20, 1964, and now abandoned.

This invention relates to intercarrier sound system for television receivers, and more particularly to improved intercarrier sound systems utilizing a non-linear triode plate detector particularly adapted for use with color television receivers.

In monochrome television receivers of the intercarrier type the picture carrier (45.75 mc.) and the sound carrier (41.25 mc.) are passed through common intermediate frequency amplifier stages. The intercarrier sound signal (a 4.5 mc. FM signal) is developed as a beat signal by heterodyning action between the picture carrier and the sound carrier, which action may conveniently be accomplished in the video or second detector of the receiver. In color television receivers the color subcarrier (3.58 mc.) is also present in the received signal and may also beat with the sound intercarrier to produce an unwanted interference signal, and it is desirable to provide as much isolation as possible between these two signals. Accordingly a separate sound detector is often utilized in color receivers, with the picture and sound carriers fed thereto from a common point in the intermediate frequency stages. The 4.5 mc. FM intercarrier sound signal therein recovered is then amplified, demodulated and fed to appropriate audio amplification and transducing circuits.

It is apparent from the foregoing that the use of a separate detector coupled to an intermediate frequency stage for deriving the intercarrier sound signal therefrom adds additional circuit components to the receiver chassis and creates additional circuit design considerations. The detector should operate with a high conversion efficiency and preferably should provide AM limiting to eliminate the necessity of a further limiter stage in processing the FM intercarrier sound signal. A diode detector, for example, is a relatively low impedance device that tends to load the intermediate frequency stage, adds attenuation, and is usually followed by a pentode limiter. A grid leak detector, although not loading the intermediate frequency stage, has a long time constant input network that tends to block on impulse noise. In addition, and not of the least importance, the detector should be simple and economical in construction and be readily adaptable to provide efficient tube socket utilization on the television chassis. It is desirable, for example, that the detector be included in the same vacuum tube envelope as the 4.5 mc. amplifier for the detected intercarrier sound signal.

It is accordingly an object of the invention to provide an improved detector circuit for the intercarrier sound signal of a color television receiver which is economical and commercially practical in construction.

Another object of the invention is to provide a detector circuit for the intercarrier sound signal of a color television receiver which provides AM limiting and which is immune to blocking by noise charge-up.

A further object of the invention is to provide an improved detector circuit which is efficient in operation and is particularly adapted for coupling to an intermediate frequency stage of a color television receiver for deriving the intercarrier sound signal from the sound and picture carriers appearing therein.

A feature of the invention is the provision of a detector circuit for the sound intercarrier signal of the color television receiver including a vacuum tube triode having a very low plate voltage and operating near cutoff for increased non-linearity to result in increased conversion efficiency, cathode biasing for improved grid limiting without blocking by noise charge-up, and having the sound carrier and the picture carrier, as appearing in the intermediate frequency stages of the receiver, coupled to its control grid electrode for isolation between the color subcarrier signal appearing in the video detector and the intercarrier sound signal developed in the detector circuit.

Another feature of the invention is the provision of low source impedance voltages for the anode and cathode of the triode of the above described circuit which are developed across low-valued resistances in the cathode return circuit of the audio output stage of the receiver.

A further feature of the invention is the provision of a detector circuit of the type described in which the vacuum tube triode thereof may conveniently be provided in the same vacuum envelope as a pentode utilized for further amplification of the 4.5 mc. intercarrier sound signal.

Further objects, features, and attending advantages of the invention will become apparent from the following description when taken in conjunction with the accompanying drawing, which is a single figure representing a color television receiver incorporating the improved detector for the intercarrier sound of the invention.

The intercarrier sound detector of the invention is intended to be used with a television receiver of the superheterodyne type, having a first detector and common intermediate frequency amplification stages for the sound carrier and the picture carrier, and adapted for processing a composite video signal for the reproduction of a color image. The composite video signal includes, in addition to the sound carrier and the picture carrier, a chrominance subcarrier. The 41.25 mc. sound carrier and the 45.75 picture carrier are coupled from an intermediate frequency stage to the control grid electrode of a vacuum tube triode, and are therein mixed to provide a 4.5 mc. intercarrier sound signal in an output circuit coupled with its anode electrode. The triode is supplied with a very low anode voltage from a low impedance source, and is further supplied with a small amount of cathode bias. Thus the triode is operated near cutoff, with its transfer characteristic non-linear over its entire operating range for greater conversion efficiency, and with grid limiting resulting from the cathode biasing for improved AM rejection.

In a preferred embodiment of the invention the anode voltage and the cathode bias for the triode are developed across low-valued resistors in the cathode return circuit of the audio output stage of the receiver. This arrangement provides a convenient, economical low impedance voltage source for the anode and biasing voltages of the triode detector.

The illustrated color television receiver in the accompanying drawing includes a radio frequency amplifier stage 12 adapted to receive a television signal via antenna 11. The output of radio frequency amplifier stage 12 is supplied to first detector 14 and the output of first detector 14 in turn is supplied to intermediate frequency amplifier stages 15 and 16. It is to be understood that a number of intermediate frequency amplifier stages may be utilized (usually three), with the final (or third) stage illustrated at 16 including vacuum tube amplifier 18. The output of amplifier 18, derived from its anode through transformer 19, is coupled to video detector 20. The picture carrier is therein detected and supplied to video amplifier stages 22 to provide a video signal of sufficient level to provide reproduction of a color image when applied to the cathodes of a color cathode-ray image reproducer 24, illustrated as the tri-gun type. Video amplifier stages 22 are also coupled to chroma decoder 26, of any usual type, to supply appropriate color difference signals to the control grids of image reproducer 24.

The output of intermediate frequency amplifier 18, appearing at its anode electrode, is also coupled by capacitor 31 to the control grid electrode of vacuum tube triode 30. Inductor 33 returns the control grid electrode of triode 30 to ground. The values of capacitor and inductor 33 are selected to provide a wave trap (series tuned to 44 megacycles) for applying the sound carrier (41.25 mc.) and the picture carrier (47.75 mc.) appearing at the output of amplifier stage 18 to the control grid electrode of triode 30. These two signals are attenuated by the skirts of the resonance curve provided by capacitor 31 and inductor for mixing in triode 30. This resonant circuit is essentially non-resistive so that capacitor 31 is not charged by impulse noise and cause blanking of triode 30.

The 4.5 mc. intercarrier sound signal developed at the anode electrode of triode 30 is coupled by transformer 32 and capacitor 35 to the input of the 4.5 mc. amplifier stage 34. The common point of the primary and secondary windings of transformer 32 is returned to ground by capacitor 37. The anode of triode 30 is also returned to ground by capacitor 39, which capacitor forms a parallel resonant circuit tuned to 4.5 mc. with the primary winding of transformer 32. Capacitor 33 provides a series resonant circuit tuned to 4.5 mc. with the secondary winding of transformer 32. Capacitor 39 also provides a bypass for the 41.25 sound carrier and the 45.75 picture carrier appearing at the anode of triode 30 so that only the 4.5 mc. intercarrier signal is coupled through transformer 32.

The amplified 4.5 mc. intercarrier sound signal provided at the output of amplifier 34 is coupled to detector circuit 40, which circuit may conveniently include an FM quadrature detector. The audio output of detector circuit 40 is supplied to audio output stage 42.

Audio output stage 42 includes an audio amplifier such as pentode 44, with transformer 46 supplying an audio output signal to suitable transducer means such as loudspeaker 48. The cathode of pentode 44 is returned to ground through low-valued resistors 52 and 54. The DC voltage developed across resistors 52 and 54 is supplied by lead 55 to the common point between the primary and secondary windings of transformer 32 and hence to the anode of triode 30 to provide an operating voltage therefor. Capacitor 56 provides a bypass for audio signals appearing on lead 55. The DC voltage appearing at the junction point between resistors 52 and 54 is supplied on lead 57 to the cathode or triode 30 to provide cathode bias therefor. It may be seen that the cathode of triode 30 is floated above ground by resistor 54, with its ground return through resistor 54.

In a practically constructed circuit triode 30 may be the triode section of a 4BL8 tube, with the other section thereof being a pentode that may conveniently be used for the 4.5 mc. amplifier 34. Pentode 44 may be a 16A8 tube with approximately 250 volts applied to its anode and drawing a nominal plate current of about 25 ma. Resistor 52 may be 330 ohms and resistor 54 may be 54 ohms. The voltage developed across resistors 52 and 54 and applied to the anode of triode 30 is approximately 8 volts. The voltage appearing at the junction of resistors 52 and 54 and applied to the cathode of triode 30 is approximately .8 volt. This low plate voltage operates triode 30 in a very non-linear part of its transfer characteristic ($i_b$–$e_c$) curve and very near cutoff. Thus the transfer characteristics of triode 30 is non-linear over its entire operating range, and the signal derived from intermediate frequency amplifier stage 16 is large with respect to its operating range. Triode 30 is cutoff during a portion of the negative swing of signals applied to its control grid, resulting in plate current pulses. The combination of these two aspects increases the conversion efficiency of triode 30 as a detector for the intercarrier sound signal. Also, large positive signals exceed zero bias so that tube 30 draws grid current to provide grid limiting. Since cathode bias is provided and since the input impedance of tube 30 is reduced somewhat when grid current is drawn, there is no grid charge-up to result in blanking in the presence of impulse noise and sync buzz. Thus triode 30 provides AM rejection and no limiting is required by the stage such as 4.5 mc. amplifier 34 following the intercarrier sound detector. This allows stage 34 to be optimized for maximum gain, and as noted, triode 30 and amplifier 34 may both be contained in the same vacuum envelope for chassis simplicity and economy of assembly.

I claim:

1. In a color television receiver having common intermediate frequency amplifier stages for the sound carrier and the picture carrier of a received color television signal, a detector circuit for deriving sound information from said received television signal including in combination, a vacuum tube triode, first network means coupled between said intermediate frequency amplifier stage and the control grid of said triode, said first network means simultaneously applying a portion of said sound carrier and said picture carrier to the control grid of said triode, a first low impedance direct current voltage source in said receiver, means direct current connected between said first direct current voltage source and the anode of said triode, with the anode voltage thereby applied to said triode of a low value to provide a non-linear transfer characteristic of said triode over its entire operating range, a second low impedance direct current voltage source in said receiver, means direct current connected between said second voltage source and the cathode of said triode, with said triode being thereby biased near cutoff, second network means coupled to the anode of said triode, said second network means tuned to the difference frequency between said sound carrier and said picture carrier to provide an intercarrier sound signal frequency modulated with audio information, and means for deriving said audio information from said intercarrier sound signal.

2. In a color television receiver having a plurality of common intermediate frequency amplifier stages for the sound carrier and the picture carrier of a received color television signal, said intermediate frequency amplifier stages including a final stage having a vacuum tube with an anode electrode, a detector circuit for deriving sound information from said received television signal including in combination, a vacuum tube triode having anode, cathode and control grid electrodes, first network means coupled between the anode electrode of the vacuum tube of said final intermediate frequency amplifier stage and the control grid electrode of said vacuum tube triode, said first network means simultaneously applying a portion of said sound carrier and said picture carrier to the control grid electrode of said vacuum tube triode, a first low impedance direct current voltage source in said receiver, means direct current connected between said first direct current voltage source and the anode electrode of said vacuum tube triode, with the anode voltage thereby applied to said vacuum tube triode of a low value to provide a non-linear transfer characteristic of said vacuum tube triode over its entire operating range, a second low impedance direct current voltage source in said receiver, means direct current connected between said second voltage source and the cathode electrode of said vacuum tube triode, with said vacuum tube triode being thereby biased near cutoff, second network means coupled to the anode of said vacuum tube triode, said second network means tuned to the difference frequency between said sound carrier and said picture carrier to provide an intercarrier sound signal frequency modulated with audio information, and means for deriving said audio information from said intercarrier sound signal.

3. In a color television receiver having common intermediate frequency amplifier stages for the sound carrier and the picture carrier of a received color television signal, a detector circuit for deriving sound information from said received television signal including in combination, a vacuum tube triode having anode, cathode, and control grid electrodes, first network means coupled between said intermediate amplifier stages and the control grid electrode of said triode, said first network means simultaneously applying a portion of said sound carrier and said picture carrier to the control grid electrode of said triode, an audio frequency amplifier stage including a vacuum tube having a cathode electrode, low-valued resistance means returning the cathode electrode of the vacuum tube of said audio frequency amplifier stage to ground reference potential, with a low-valued direct current voltage derived across said resistance means, circuit means direct current connected between the cathode electrode of the vacuum tube of said audio frequency amplifier stage and the anode electrode of said triode, with the anode voltage applied to said triode of a low value to provide a non-linear transfer characteristic of said triode over its entire operating range, a low impedance direct current voltage source in said receiver, means direct current connected between said low impedance voltage source and a cathode electrode of said triode, with said triode being thereby biased near cutoff, second network means coupled to the anode electrode of said triode, said second network means tuned to the difference frequency between said sound carrier and said picture carrier to provide an intercarrier sound signal frequency modulated with audio information, means for deriving said audio information from said intercarrier sound signal, means applying said derived audio information signal to the vacuum tube of said audio frequency amplifier stage.

4. In a color television receiver having common intermediate frequency amplifier stages for the sound carrier and the picture carrier of a received color television signal, a detector circuit for deriving sound information from said received television signal including in combination, an electron control triode having control, common and output electrodes, first network means coupled between said intermediate frequency amplifier stage and said control electrode of said triode, said first network means simultaneously applying a portion of said sound carrier and said picture carrier to the control grid of said triode, a first low impedance direct current voltage source in said receiver, means direct current connected between said first direct current voltage source and said output electrode of said triode, with the voltage thereby applied to said triode of a low value to provide a non-linear transfer characteristic of said sound and picture carriers in said triode over its entire operating range, a second low impedance direct current voltage source in said receiver, means direct current connected between said second voltage source and said common electrode of said triode, with said triode being biased near cutoff by such last named means, second network means coupled to said output electrode of said triode, said second network means tuned to the difference frequency between said sound carrier and said picture carrier to provide an intercarrier sound signal frequency modulated with audio information, and means for deriving said audio information from said intercarrier sound signal.

5. In a color television receiver having a plurality of common intermediate frequency amplifier stages for the sound carrier and the picture carrier of a received color television signal, said intermediate frequency amplifier stages including a final stage with an output circuit, a detector circuit for deriving sound information from said received television signal including in combination, an electron control triode having control, common and output electrodes, input network means coupled between the output circuit of said final intermediate frequency amplifier stage and said control electrode of said triode, said input network means including a series coupling capacitor and shunt impedance means to simultaneously apply a portion of said sound carrier and said picture carrier to said control electrode of said triode, said input network means having resistor and capacitor values selected to reduce chargeup thereby upon conduction by said control electrode, output circuit means including a direct current voltage source connected to said output electrode of said triode, with the voltage thereby applied to said triode of a low value to provide a non-linear transfer characteristic of said triode over its entire operating range, a bias circuit direct current connected between a reference point and said common electrode of said triode with said triode being thereby biased to be cutoff by the sound and picture carriers, said output circuit means including a circuit tuned to the difference frequency between said sound carrier and said picture carrier to provide an intercarrier sound signal frequency modulated with audio information, and means coupled to said output circuit means for deriving said audio information from said intercarrier sound signal.

References Cited

UNITED STATES PATENTS

| | | | |
|---|---|---|---|
| 2,796,518 | 6/1957 | Schlesinger | 329—192 |
| 2,884,485 | 4/1959 | Shlachter | 178—5.4 |

JOHN W. CALDWELL, *Primary Examiner.*

R. MURRAY, *Assistant Examiner.*